3,849,447
BENZOPYRAN DERIVATIVES
Ulrich Eder and Rudolf Wiechert, Berlin, Germany, assignors to Schering Aktiengesellschaft, Berlin, Germany
No Drawing. Filed June 9, 1972, Ser. No. 261,216
Claims priority, application Germany, June 11, 1971, P 21 30 053.8; Nov. 30, 1971, P 21 60 066.8
Int. Cl. C07d 7/20
U.S. Cl. 260—345.2    31 Claims

ABSTRACT OF THE DISCLOSURE

Novel benzopyran derivatives of the formula

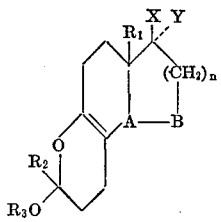

wherein $R_1$, $R_2$ and $R_3$ each are lower alkyl; $n$ is the integer 1 or 2; >A—B— is >CH—$CH_2$— or >C=CH—; X is a free, esterified, or etherified hydroxyl group; and Y is H or X and Y collectively are =O, are valuable intermediates in the synthesis of steroids.

SUMMARY OF THE INVENTION

This invention relates to novel benzopyran derivatives of the general Formula I

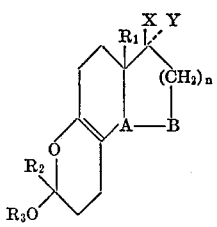

I wherein $R_1$, $R_2$ and $R_3$ each are lower alkyl; $n$ is the integer 1 or 2; >A—B— is >CH—$CH_2$— or >C=CH—; X is a free, esterified, or etherified hydroxyl group and Y is H or X and Y collectively are =O and to a process for their production.

DETAILED DISCUSSION

Of the compounds of this invention preferred are those meeting one or more of the following definitions:

(a) $n$ is 1;
(b) X is a free, esterified or etherified hydroxyl group and Y is H or X and Y collectively are =O; and
(c) one or more of $R_1$, $R_2$ and $R_3$ are methyl or ethyl.

It will be apparent to those skilled in the art that when X is esterified or etherified OH, the exact nature of the ester or ether group is not critical to the utility of the compounds of Formula I as intermediates in the production of steroids and can thus be varied in a conventional manner without destroying their effectiveness. Thus, compounds of this invention include those wherein X is acyloxy, acyl being the acyl group of any organic acid, e.g., a carboxylic-acid containing up to 18 carbon atoms, especially lower (1–6) carbon atoms and intermediate (7–12) aliphatic carboxylic, preferably an alkanoic acid, which can be unsaturated, branched, polybasic, or substituted in the usual manner, for example by hydroxy or halogen atoms; a cycloaliphatic, aromatic and mixed aromatic-aliphatic (alkaryl and aralkyl) acid, which can likewise be substituted in the usual manner, e.g., acids containing 1–18, preferably 2–12 carbon atoms, including an aliphatic acid containing 1–18, preferably 1–6 carbon atoms, e.g., formic, acetic, propionic, butyric, isobutyric, α-ethylbutyric, caproic, valeric, isovaleric, α-ethylvaleric, 2-methylbutyric, 3-ethylbutyric, hexanoic, trimethylacetic, diethylacetic, triethylacetic, enanthic, octanoic, undecyclic, oleic and palmitic acid; a cyclic acid, preferably a cycloaliphatic acid, containing, e.g., 5–18 carbon atoms, e.g., cyclopropylideneacetic, cyclobutylcarboxylic, cyclopentylcarboxylic, cyclopentylacetic, cyclopentylpropionic, cyclohexylcarboxylic, cyclohexylacetic and β-cyclohexylpropionic acid, phenylpropionic acid, phenylacetic acid; a carbocyclic aryl or alkaryl acid, e.g., containing 6–18 carbon atoms, and 1 to 5, preferably 1 or 2 rings, e.g., benzoic, 2-, 3-, or 4-methyl-benzoic, 2,3-, 2,4-, 2,5-, 2,6-, 3,4- and 3,5-dimethylbenzoic, ethylbenzoic, 2,3,6-trimethylbenzoic, and 3-methyl-α-naphthoic acid; an aralkyl acid, e.g., containing 7 to 18 carbon atoms, e.g., β-phenylpropionic, a polybasic acid, e.g., containing 2–18 carbon atoms and 0 to 5 hydroxy groups, e.g., glycolic, succinic, lactic, citric, tartaric, d-maleic, d-glyceric, and salicylic acid; the corresponding acids containing one, two or more of simple substituents, e.g., halo, alkoxy, acyloxy, etc., in the molecule, e.g., chloroacetic, fluoroacetic, dichloroacetic, trichloroacetic, trifluoroacetic, 2,3,4-trimethoxybenzoic, phenoxyacetic, α - naphthoxyacetic acid, etc.

The ester group can also be an ester of a sulfonic acid, e.g., an arylsulfonic, including benzenesulfonic, p-toluene-sulfonic, m,m'-dimethylbenzenesulfonic, o,o'-dimethylbenzenesulfonic, sym. - trimethylbenzenesulfonic, sym. - triethylbenzenesulfonic, m - ethylbenzenesulfonic, para - isopropylbenzenesulfonic, m - n - butylbenzenesulfonic acid, or an alkylsulfonic, e.g., methanesulfonic, ethanesulfonic, propanesulfonic, isopropanesulfonic, butanesulfonic, tert.-butanesulfonic, pentanesulfonic, isopentanesulfonic, hexanesulfonic, heptanesulfonic, octylsulfonic or heterocyclicsulfonic, e.g., α-pyridinesulfonic, α-pyranesulfonic, α-thiophensulfonic, α-furansulfonic, α-tetrahydrofuransulfonic, or other alkyl-, carbocyclic and heterocyclic aryl-, alkaryl- and aralkylsulfonic acid, preferably one containing 1–8 carbon atoms and 0–2, preferably 0–1 N, S or O heteroatoms, which are preferably ring carbon atoms in a heterocyclic ring.

The $R_1$, $R_2$ and $R_3$ lower alkyl groups are preferably those of 1–4 carbon atoms. Examples of such alkyl groups are, for example, methyl, ethyl, n-propyl, isopropyl and/or n-butyl. Especially preferred $R_1$, $R_2$, and $R_3$ groups are methyl and ethyl.

Preferred esterified and etherified hydroxyl X groups are acyloxy wherein acyl is the acyl radical of a hydrocarbon carboxylic acid of 1–10 carbon atoms and alkoxy of 1–10 carbon atoms which optionally can be substituted by phenyl. Specific examples are acetoxy, propionyloxy, butyryloxy, trimethylacetoxy, pentanoyloxy, hexanoyloxy, heptanoyloxy, octanoyloxy and benzoyloxy. Examples for alkoxy which optionally can be phenyl-substituted are the methoxy, ethoxy, propoxy, isopropoxy, butoxy, tert.-butoxy and benzyloxy.

In its process aspect, this invention relates to a process for the preparation of the novel benzopyran derivatives of Formula I by cyclizing a compound of the general Formula II

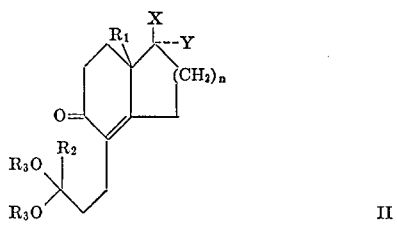

wherein $R_1$, $R_2$, $R_3$, X, Y and $n$ have the values given above for Formula I, in the presence of acidic catalysts; and optionally thereafter conducting one or more of the following steps: reducing a keto group when X=O; hydrogenating a double bond present in —A—B—; and/or esterifying or etherifying a free hydroxy group when X=OH; and hydrolyzing an ester group when X is an esterified hydroxy group.

The cyclization of the starting compounds of general Formula II is effected under the influence of an acidic catalyst. Suitable catalysts for the cyclization are, in particular, carboxylic acids and phenols, e.g., formic acid, acetic acid, propionic acid, monofluoroacetic acid, trichloroacetic acid, methoxyacetic acid, trimethylacetic acid, cyclopentylpropionic acid, benzoic acid, p-hydroxybenzoic acid, p-nitrobenzoic acid, phenoxyacetic acid, phenylacetic acid, oxalic acid, malonic acid, succinic acid, phenol, o-, m-, or p-cresol, o-, m-, or p-chlorophenol, resorcinol, p-nitrophenol, 2,4-dinitrophenol and 2,4,6-trinitrophenol.

On the other hand, it is also possible to employ as the acidic catalyst for the cyclization mineral acids, sulfonic acids, or Lewis acids, e.g., hydrogen chloride, sulfuric acid, phosphoric acid, perchloric acid, methanesulfonic acid, benzenesulfonic acid, p-toluenesulfonic acid and boron trifluoride.

The acids or phenols utilized for the cyclization are preferably employed in catalytic amounts, for example, 0.1 mol to 0.001 mol of acidic catalytic per mol of starting compound.

The cyclization is preferably conducted in an aprotic solvent. Suitable solvents are, for example, ethers, e.g., diethyl ether, diisopropyl ether, di-n-butyl ether, tetrahydrofuran, anisole and dimethoxyethane; hydrocarbons, e.g., hexane, cyclohexane, benzene, toluene and xylene and chlorinated hydrocarbons, e.g., carbon tetrachloride, chloroform, tetrachloroethane, 1,2-dichloroethane and chlorobenzene. Alcohols, e.g., methanol, ethanol, n-propanol and n-butanol can also be employed as solvents for the cyclization.

When conducting the cyclization reaction, it is advantageous to remove the alcohol used as the solvent or liberated during the cyclization by distillation or vacuum distillation from the reaction mixture.

The cyclization can be effected at a low temperature as well as at the elevated temperature, preferably 0° C. to 150° C.

It is surprising that the compounds of Formula II are cyclized in the presence of an acidic catalyst to compounds of Formula I wherein —A—B— is >C=CH—.

The nonconjugated keto group (X=O) present in the cyclization products can, if desired, be reduced to an hydroxyl group in a conventional manner. This reduction can be conducted, for example, with complex metal hydrides, e.g., sodium borohydride, lithium aluminium hydride, lithium tri-tert.-butoxy aluminum hydride and diisobutyl aluminum hydride. The method of Meerwein-Ponndorf can also be utilized for the reduction, for example, by reacting a ketone of Formula II (X=O) with a secondary alcohol, e.g., isopropanol, in the presence of an aluminum alcoholate, e.g., aluminum isopropylate. These reducing agents are suitable especially for the preparation of compounds of Formula I wherein the thus-formed hydroxyl group is in the α-position.

The compounds of Formula I wherein —A—B— is >C=CH— can optionally be hydrogenated to compounds of Formula I wherein —A—B— is >CH—CH$_2$—. This hydrogenation is preferably effected with catalytically activated hydrogen, in suitable catalysts being primarily heavy metal catalysts, e.g., Raney nickel, palladium, rhodium and platinum oxide catalysts. In these hydrogenation processes, those compounds are preferably formed wherein the hydrogen atom entering at the tertiary carbon atom is oriented in a β-configuration.

A free hydroxyl group X can optionally be esterified or etherified.

The esterification of the free hydroxyl group of the hydroxyl compounds of the general Formula I can be conducted with carboxylic acid anhydrides or carboxylic acid chlorides in the presence of a base, e.g., sodium bicarbonate, potassium bicarbonate, pyridine or collidine.

To etherify the free hydroxyl group (X=OH), a conventional etherification method according to Williamson can be employed, for example.

The benzopyran derivatives of Formula I produced according to the process of this invention are valuable intermediates. They are especially suitable for producing pharmacologically effective steroids by total synthesis.

For example, 3-methyl-6aα-alkyl-3-alkoxy-2,3,5,6,6a,8, 9,9aβ-octahydrocyclopenta-[f][1]-benzopyran - 7[1H]α-ols of Formula I ($n=1$, X=OH) can be converted to the corresponding des-A-17β-hydroxy-13-alkyl-9-gonen-3-ones by heating with hydrochloric acid in dioxane.

The esters and ethers of 3-methyl-6aα-alkyl-3-alkoxy-2,3,5,6,6a,8,9,9aβ-octahydrocyclopenta - [f][1] - benzopyran-7[1H]α-ols of Formula I ($n=1$, X=esterified or etherified OH) can, for example, also be converted into the corresponding des-A-17β-hydroxy-13-alkyl-9-gonen-5-ones by heating with hydrochloric acid in dioxane and, if an ester or ether group remains at the 17-position, subsequently splitting off the ester or ether group, respectively, to produce the free hydroxy group.

The thus-prepared des - A - 17β - hydroxy - 13 - alkyl-9-gonen-5-ones can be converted in a conventional manner into pharmacologically valuable steroids, e.g., estrone, estradiol, 18-methylestradiol, equilenin, testosterone, 18-methyl-testosterone, 17α-ethinyl-19-nortestosterone and 17α-ethinyl-18-methyl-19-nortestosterone and the corresponding 18-homologues thereof.

By reacting the compounds of Formula I wherein $n$ is 2 in the same manner, the corresponding D-homo-steroids are obtained.

The esters and ethers of 3-methyl-6aα-alkyl-3-alkoxy-2,3,5,6a,8,9,10,10a-decahydrocyclo-hexa - [f][1] - benzopyran-7[1H]α-ols may be converted by heating with hydrochloric acid in dioxan, and optionally splitting of the ester or ether group to 17aβ-hydroxy-13-alkyl-des-A-D-homo-9-gonen-5-ones, which can be converted to physiologically active D-homo steroids by the method described in J. Org. Chem., 34, 1969, 107 and 1457 or in the United States patent specification No. 3,591,607.

The esters and ethers of 3,6aα-dialkyl-3-alkoxy-2,3,6, 6a,8,9,9aβ-octahydrocyclopenta - [f][1] - benzopyran-7 [1H]α-ols may be converted in the same manner to 17β-hydroxy-10,13-dialkyl-9-gonene-5-ones, which can be converted to pharmacologically active keto steroids as described in J. of Pure and Appl. Chem., 9, 1964, 131 and in Angew. Chem., 66, 1954, 81.

The starting compounds of the process of this invention can be produced, for example, as disclosed in our copending application Ser. No. 261,217, filed June 9, 1972, as follows:

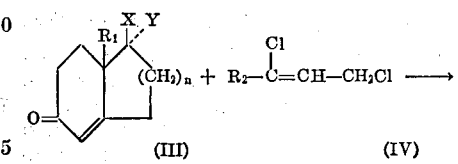

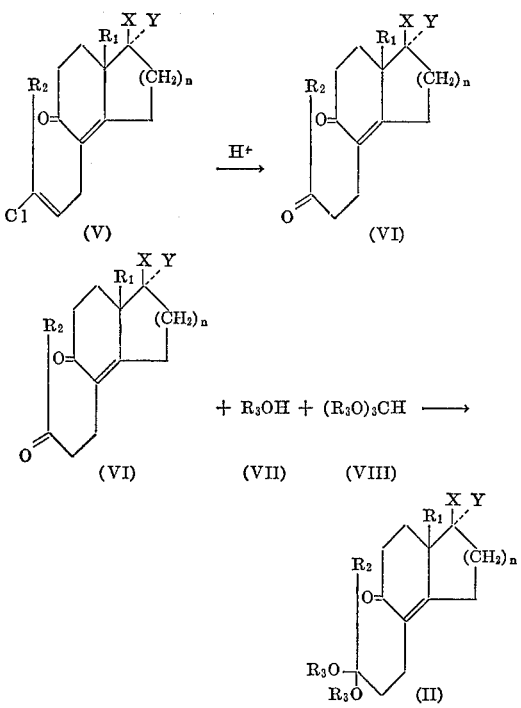

In the above formulae, $R_1$, $R_2$, $R_3$, X and Y and $n$ have the same values as in Formula I.

The preparation of compounds of Formula VI can be conducted, for example, as follows: Suspend 1.2 mols of potassium tert.-butylate in 1 liter of absolute dimethoxyethane and cool the mixture to 0° C. under an argon atmosphere. Then mix the mixture with a solution of 1 mol of a compound of Formula III in 1 liter of absolute dimethoxyethane, agitate for 20 minutes at 0° C. and then mix with 1.25 mols of a compound of Formula IV. Stir the reaction mixture for 16 hours at 0° C. and then pour into ice water. Extract the thus-formed product of Formula V with methylene chloride and purify by chromatography over a silica gel column.

Dissolve one mol of the thus-produced compound of Formula V in 1 liter of methylene chloride, cool the solution to −10° C. and then, with stirring, add dropwise thereto 530 ml. of concentrated sulfuric acid cooled to 0° C., thereafter, agitate the reaction mixture for 20 minutes, pour into ice water, extract the thus-formed compound of Formula VI with ethyl acetate and purify by chromatography over a silica gel column and/or by recrystallization.

Compounds of Formula VI can be ketalized to compounds of Formula II with lower alcohols, preferably by reaction with a lower alkanol in the presence of an acidic catalyst, e.g., mineral acids, including hydrochloric acid, sulfuric acid and perchloric acid; sulfonic acids, e.g., methanesulfonic acid, benzenesulfonic acid, and p-toluenesulfonic acid; Lewis acids, e.g., boron trifluoride; and phenols, e.g., p-nitrophenol and 2,4-dinitrophenol.

The ketalization is particularly successful if a water-binding agent is also present in the reaction mixture. Suitable water-binding agents are, for example, anhydrous sodium sulfate, anhydrous magnesium sulfate and anhydrous calcium sulfate. Also suitable as water-binding agents are the orthoformic acid esters of the alcohols utilized for the ketalization.

The ketalization is preferably conducted at a reaction temperature of from −20° C. to +80° C. The ketalization can be conducted, for example, as follows:

Mix one mol of a compound of Formula VI with 2.5 mols of an orthoformic acid ester of Formula VIII and about 8–10 mols of an alcohol of Formula VII. Then, add 3 ml. of a 0.5% alcoholic p-toluenesulfonic acid solution to the mixture and allow the reaction mixture to stand for about 30–180 minutes at room temperature.

The reaction mixture containing the compound of Formula II obtained by the ketalization of a compound of Formula VI basically can be employed without any further purification for conducting the cyclization step of the process of this invention. This is possible because the compounds of Formula II are cyclized, under the present reaction conditions, to compounds of Formula I wherein —A—B is >C=CH—, when the reaction temperature is elevated or when the reaction time is lengthened. In this connection, it is advantageous to remove the alcohol utilized as the solvent by vacuum distillation and optionally to replace the alcohol by an aprotic solvent, such as, for example, benzene or toluene.

It is also possible to isolate the compounds of Formula II as pure products. For this purpose, the reaction mixture is poured into ice-cold bicarbonate solution after the termination of the ketalization reaction, extracted with ether, the ether phase concentrated under vacuum, and the residue purified by chromatography and/or crystallization.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The term "rac." as used in the examples means the racemates (±) of the named compounds.

EXAMPLE 1

12.85 g. of rac.-7a-methyl-4-(3',3'-dimethoxybutyl-5,6,7,7a-tetrahydroindan-1,5-dione (m.p. 97–100° C.) is dissolved in 100 ml. of abolute benzene, mixed with 50 mg. of malonic acid, and heated while gradually distilling off the thus-formed methanol. After 90 minutes, the reaction mixture is allowed to cool, washed with sodium bicarbonate solution and water; the organic phase is dried with sodium sulfate and concentrated, thus obtaining 11.05 g. of rac.-3,6aα-dimethyl-3-methoxy-2,3,5,6,6aα,8-hexahydrocyclopenta-[f][1]-benzopyran - 7[1H] - one as a colorless oil. $\epsilon_{249}$=18,300. IR bands at 5.78μ and 6.1μ.

EXAMPLE 2

19.8 g. of (+)-7aβ-methyl-4-(3',3'-dimethoxybutyl)-5,6,7,7a-tetrahydroindan-1,5-dione (m.p. 114–123° C. under decomposition; $[\alpha]_D^{21}$=−212° in chloroform) is reacted as described in Example 1, but with the use of 50 mg. of p-nitrophenol as the acidic catalyst, and then worked up.

In this way, 17.1 g. of (−)-3,6aα-dimethyl-3-methoxy-2,3,5,6,6a,8 - hexahydrocyclopenta - [f][1] - benzopyran-7[1H]-one is produced as a colorless oil. $[\alpha]_D^{21}$=−203° (in chloroform; c.=0.5%). $\epsilon_{250}$=17,950. IR bands at 5.78μ and 6.09μ.

EXAMPLE 3

Analogously to Example 1, rac.-7aβ-methyl-4-(3',3'-diethoxybutyl) - 5,6,7,7a-tetrahydroindan-1,5-dione (colorless oil; $\epsilon_{249}$=11,100) is reacted and yields rac.-3,6aα-dimethyl - 3 - ethoxy - 2,3,5,6,6a,8-hexahydrocyclopenta-[f][1]-benzopyran-7[1H]-one as a colorless oil. $\epsilon_{250}$= 18,100.

EXAMPLE 4

(+) - 7aβ - Ethyl-4-(3',3'-dimethoxybutyl) - 5,6,7,7a-tetrahydroindan-1,5-dione (m.p. 88–91° C.;

$$[\alpha]_D^{21}=+161°$$

in chloroform) is reacted as described in Example 1 with the use of p-nitrophenol as the acidic catalyst, thus producing (−) - 3-methyl-6aα-ethyl-3-methoxy-2,3,5,6,6a,8-hexahydrocyclopenta - [f][1]-benzopyran-1[1H]-one as a colorless oil. $\epsilon_{251}$=17,500. $[\alpha]_D^{21}$=−155° (in chloroform). IR bands at 5.77μ and 6.12μ.

EXAMPLE 5

11.75 g. of rac.-3,6a-dimethyl-3-methoxy-2,3,5,6,6a,8-hexahydrocyclopenta-[f][1]-benzopyran-7[1H]-one is dissolved in 90 ml. of absolute tetrahydrofuran and added dropwise under agitation within 10 minutes to an ice-cooled suspension of 1.2 g. of lithium aluminum hydride in 80 ml. of absolute tetrahydrofuran. The reaction mixture is allowed to stand for 30 minutes at 0° C., then mixed with 1.2 ml. of water, 1.2 ml. of 15% aqueous sodium hydroxide solution, and again with 3.6 ml. of water. Thereafter, the thus-separated solids are filtered off, the solution is concentrated under vacuum, and 11.35 g. of rac.-3,6α-dimethyl-3-methoxy-2,3,5,6,6a,8-hexahydrocyclopenta-[f][1]-benzopyran-7[1H]α-ol is thus obtained as a colorless oil. $\epsilon_{250}=17,850$. IR band at $6.11\mu$.

EXAMPLE 6

(+)-3,6α-Dimethyl - 3 - methoxy-2,3,5,6,6a,8-hexahydrocyclopenta-[f][1]-benzopyran-7[1H]-one is reacted as described in Example 5, thus producing (—)-3,6α-dimethyl-3-methoxy - 2,3,5,6,6a,8 - hexahydrocyclopenta-[f][1]-benzopyran-7[1H]α-ol as a colorless oil.

$[\alpha]_D^{21} = -75°$ (in chloroform; c.=0.5).

EXAMPLE 7 rac.-3,6α-Dimethyl - 3 - ethoxy-2,3,5,6,6a,8-hexahydrocyclopenta-[f][1]-benzopyran-7[1H]-one is reacted as set forth in Example 5, thus obtaining rac.-3,6α-dimethyl-3-ethoxy - 2,3,5,6,6a,8 - hexahydrocyclopenta-[f][1]-benzopyran-7[1H]α-ol as a colorless oil.

EXAMPLE 8

(—)-3-Methyl-6aα-ethyl-3-methoxy - 2,3,5,6,6a,8-hexahydrocyclopenta-[f][1]-benzopyran-7[1H]-one is reacted as described in Example 5, thus producing (—)-3-methyl-3-methoxy - 2,3,5,6,6a,8 - hexahydrocyclopenta-[f][1]-benzopyran-7[1H]α-ol as a colorless oil. $[\alpha]_D^{21} = -53°$ (in chloroform).

EXAMPLE 9

(a) 13.9 g. of rac.-3,6aα-dimethyl-3-methoxy-2,3,5,6,6a,8 - hexahydrocyclopenta-[f][1]-benzopyran-7[1H]α-ol is dissolved in 200 ml. of ethyl acetate, mixed with 1 g. of 10% palladium animal charcoal, and hydrogenated with hydrogen until the theoretically required amount has been absorbed, under atmospheric pressure. Then, the catalyst is filtered off, the solvent concentrated under vacuum, and 13.8 g. of rac.-3,6aα-dimethyl-3-methoxy-2,3,5,6,6a,8,9,9aβ - octahydrocyclopenta - [f][1]-benzopyran-7[1H]α-ol is obtained as a colorless oil.

(b) 12.8 g. of rac.-3,6aα-dimethyl-3-methoxy-2,3,5,6,6a,8,9,9aβ - octahydrocyclopenta - [f][1]-benzopyran-7[1H]α-ol is heated with 100 ml. of dioxane and 10 ml. of 4N hydrochloric acid for 3 hours under reflux. Subsequently, the reaction mixture is concentrated under vacuum, the residue is diluted with water and extracted with methylene chloride. The methylene chloride phase is concentrated under vacuum, and the thus-obtained crude product is purified by chromatography over a silica gel column and recrystallization from hexane-ethyl acetate, thus obtaining 9.3 g. of rac.-des-A-17β-hydroxy-9-estren-5-one, m.p. 114–115.5° C.

EXAMPLE 10

(a) (—)-3,6aα-Dimethyl-3-methoxy-2,3,5,6,6a,8-hexahydrocyclopenta-[f][1]-benzopyran-7[1H]α-ol is reacted as described in Example 9(a), thus obtaining 3,6aα-dimethyl - 3 - methoxy-2,3,5,6,6a,8,9,9aβ-octahydrocyclopenta[f][1]-benzopyran-7[1H]α-ol.

(b) The thus-obtained 3,6aα-dimethyl-3-methoxy-2,3,5,6,6a,8,9,9aβ - octahydrocyclopenta - [f][1]-benzopyran-7[1H]α-ol is reacted as described in Example 9(b), thus obtaining (—)-des-A-17β-hydroxy-9-estren-5-one, m.p. 113–114° C. $[\alpha]_D^{21} = -46°$ (chloroform; c.=1%).

EXAMPLE 11

(a) rac.-3,6aα - Dimethyl-3-ethoxy-2,3,5,6,6a,8-hexahydrocyclopenta-[f][1]-benzopyran-7[1H]α-ol is reacted as set forth in Example 9(a), thus obtaining 3,6aα-dimethyl-3-ethoxy - 2,3,5,6,6a,8,9,9aβ - octahydrocyclopenta-[f][1]-benzopyran-7[1H]α-ol as a colorless oil.

(b) The thus-produced 3,6aα-dimethyl-3-ethoxy-2,3,5,6,6a,8,9,9aβ - octahydrocyclopenta - [f][1]-benzopyran-7[1H]α-ol is reacted as described in Example 9(b), thus obtaining rac.-des-A-17β-hydroxy - 9 - estren-5-one, m.p. 114–115.5° C.

EXAMPLE 12

(a) (—)-3-Methyl-6aα-ethyl - 3 - methoxy-2,3,5,6,6a,8-hexahydrocyclopenta - [f][1] - benzopyran-7[1H]α-ol is reacted as described in Example 9(a), thus producing 3-methyl-6aα-ethyl - 3 - methoxy-2,3,5,6,6a,8,9,9aβ-octahydrocyclopenta-[f][1]-benzopyran-7[1H]α-ol as a colorless oil.

(b) The thus-produced 3-methyl-6aα-ethyl-3-methoxy-2,3,5,6,6a,8,9,9aβ - octahydrocyclopenta - [f][1]benzopyran-7[1H]α-ol is reacted as described in Example 9(b), yielding (—)-des-A - 13β - ethyl - 17β - hydroxy-9-gonen-5-one, m.p. 151–153° C. $[\alpha]_D^{21} = -69°$ (in chloroform).

EXAMPLE 13

20g. of rac.-7a-methyl-4-(3'-oxobutyl)-5,6,7,7a-tetrahydroindan-1,5-dione (m.p. 92–94° C.) is dissolved in 200 ml. of methanol and 10 ml. of orthoformic acid trimethyl ester, mixed with 2.8 ml. of a 0.5% methanolic p-toluensulfonic acid solution, and allowed to stand for 45 minutes at room temperature.

Then, 400 ml. of benzene is added to the reaction mixture which contains rac.-7a-methyl-4-(3',3'-dimethoxybutyl)-5,6,7,7a-tetrahydroindan-1,5-dione, and the mixture is heated so that the methanol is distilled off. After 30 minutes, the reaction mixture is allowed to cool, worked up as described in Example 1, and rac.-3,6aα-dimethyl-3-methoxy - 2,3,5,6,6a,8 - hexahydrocyclopenta-[f][1]-benzopyran-7[1H]-one is obtained as a colorless oil. $\epsilon_{249}=18,300$.

EXAMPLE 14

(a) 50 g. of 1β-benzoyloxy-7aβ-methyl-5,6,7,7a-tetrahydroindan-5-one (colorless oil $[\alpha]_D^{20} = +94°$) is dissolved in 300 ml. of absolute dimethoxyethane and added dropwise within 10 minutes to a suspension of 25 g. of potassium tert.-butylate in 300 ml. of dimethoxyethane at 0° C. After 10 minutes, 25 ml. of distilled 1,3-dichlorobutene-2 is added, and the mixture is stirred for 5 hours under an argon atmosphere in a bath temperature of 0° C. Then the reaction mixture is poured into ice water, extracted with methylene chloride, the methylene chloride phase is concentrated under vacuum, and the thus-obtained crude product is purified by chromatography over a silica gel column, thus obtaining 46.4 g. of 1β-benzoyloxy-7aβ-methyl - 4 - (3'-chlorobuten-2'-yl)-5,6,7,7a-tetrahydroindan-5-one as a colorless oil. IR bands at $5.81\mu$ and $6.02\mu$. UV: $\lambda_{max}$ 237 nm. ($\epsilon$=18,500), shoulder at 249 nm. $[\alpha]_D^{20} = +49°$ (1% in chloroform).

(b) 200 ml. of distilled methylene chloride is mixed with 120 ml. of concentrated sulfuric acid, cooled to —10° C., mixed with 23.7 g. of 1β-benzoyloxy-7aβ-methyl-4-(3'-chlorobuten-2'-yl) - 5,6,7,7a - tetrahydroindan-5-one in 40 ml. of methylene chloride, and maintained at —5° C. for 20 minutes under strong agitation.

Then, the mixture is poured onto 2 l. of ice water and extracted with ethyl acetate. The crude product is crystallized from diisopropyl ether, thus obtaining 16.9 g. of 1β-benzoyloxy - 7aβ - methyl-4-(3'-oxobutyl)-5,6,7,7a-tetrahydroindan-5-one, m.p. 61–63° C.; $[\alpha]_D^{20} = +61°$ (1% in benzene).

(c) 5 g. of 1β-benzoyloxy-7aβ-methyl-4-(3'-oxobutyl)-5,6,7,7a-tetrahydroindan-5-one is dissolved in 50 ml. of absolute methanol and 5 ml. of the trimethyl ester of orthoformic acid and cooled to 0° C. Then, 0.75 ml. of 0.5% methanolic p-toluene-sulfonic acid solution is added thereto, the mixture is stirred for 2 hours at 0° C., and the solvent is distilled off under vacuum.

(d) The thus-obtained crude 1β-benzoyloxy-7aβ-methyl-4-(3′,3′-dimethoxybutyl)-5,6,7,7a - tetrahydroindan-5-one, $[\alpha]_D^{20} = +50°$ (c.=1; benzene) is dissolved in 100 ml. of absolute benzene and refluxed. Within 90 minutes, 50 ml. of distillate is removed. After cooling, the reaction mixture is poured into aqueous sodium bicarbonate solution, extracted with methylene chloride, the methylene chloride phase is concentrated under vacuum, and 5.1 g. of 7α-benzoyloxy-3,6aα-dimethyl - 3 - methoxy-1,2,3,5,6,6a,7β,8-octahydrocyclopenta-[f][1]-benzopyran is produced as a colorless oil. $[\alpha]_D^{20} = -13°$ (c.=1; benzene). IR bands at 5.81μ and 6.1μ. UV: $\lambda_{max}$ 250 nm.; ε=17,500.

(e) 5.4 g. of 7α-benzoyloxy-3,6aα-dimethyl-3-methoxy - 1,2,3,4,6,6a,7β,8 - octahydrocyclopenta - [f][1]-benzopyran is dissolved in 60 ml. of ethyl acetate and, after the addition of 0.6 g. of palladium charcoal (10%), hydrogenated at room temperature and under normal pressure. The hydrogen absorption is terminated in 1.5 hours. After filtering off the catalyst, concentrating the solvent under vacuum, and chromatographing the residue over a silica gel column, 5.1 g. of 7α-benzoyloxy-3,6aα-dimethyl - 3 - methoxy-1,2,3,5,6,6a,7β,8,9,9aβ-decahydrocyclopenta[f][1]-benzopyran is produced as a colorless oil. $[\alpha]_D^{20} = +14.3°$ (1%, benzene); IR band at 5.82μ.

EXAMPLE 15

(a) 10 g. of 1β-tert.-butoxy-7aβ-methyl-5,6,7,7a-tetrahydroindan-5- one ($[\alpha]_D^{20} = +109°$; c.=1, benzene) is dissolved in 150 ml. of absolute dimethoxyethane and refluxed for 1.5 hours after the addition of 2 g. of sodium hydride suspension (55% strength). Then, a solution of 6 ml. of 4-chloro-2-butanone in 50 ml. of dimethoxyethane is added to the reaction mixture at 0° C. within 30 minutes, and the mixture stirred for 15 hours under ice cooling. The solvent is thereafter removed under vacuum, the residue worked up as usual, and the thus-obtained product is chromatographed by means of hexane-acetone gradients over a silica gel column.

As a first fraction, 5.3 g. of 1β-tert.-butoxy-7aβ-methyl-4-(3′-ketobutyl)-5,6,7,7a-tetrahydroindan-5-one is produced in the form of a colorless oil.

IR spectrum: bands at 5.85μ and 6.05μ.
UV spectrum: $\lambda_{max}$ 249 nm.; ε=11,200.
$[\alpha]_D^{20} = +60.6°$ (c.=1; benzene).

As the second fraction, 1β-tert.-butyloxy-7aβ-methyl-4-(3′ - ketobutyl)-5,6,7,7a-tetrahydroindan-5-one is obtained as a colorless oil (3.8 g.).

IR spectrum: bands at 5.85μ and 6.05μ.
UV spectrum: $\lambda_{max}$ 240 nm.; ε=10,900.
$[\alpha]_D^{20} = +96°$ (c.=1; benzene).

(b) 3.8 g. of 1β-tert.-butoxy-7aβ-methyl-4-(3′-ketobutyl)-5,6,7,7a-tetrahydroindan-5-one is dissolved in 40 ml. of absolute methanol and 4 ml. of the trimethyl ester of orthoformic acid. After the addition of 0.2 ml. of 0.5% methanolic p-toluene-sulfonic acid solution, the mixture is agitated for 3 hours under ice cooling.

Thereafter, cold sodium bicarbonate solution is poured into the reaction mixture, the latter is extracted with methylene chloride, the extract is concentrated, and 3.8 g. of 1β-tert.-butoxy-7aβ-methyl-4-(3′,3′-dimethoxybutyl)-5,6,7,7a-tetrahydroindan-5-one is produced as a colorless oil.

IR: band at 6.05μ.
UV: $\lambda_{max}$ 250 nm.; ε=10,700.
$[\alpha]_D^{20} = +62°$ (c.=1; benzene).

(c) 4 g. of 1β-tert.-butoxy-7aβ-methyl-4-(3′,3′-dimethoxybutyl)-5,6,7,7a-tetrahydroindan-5-one is dissolved in 100 ml. of absolute benzene, and 5 mg. of malonic acid is added; then, the mixture is heated for 1 hour to the boiling point, withdrawing 50 ml. of distillate during this time.

After cooling, the reaction mixture is extracted with saturated sodium bicarbonate solution, dried with sodium sulfate, and the solvent distilled off under vacuum, thus obtaining 3.6 g. of 7α-tert.-butoxy-3,6aα-dimethyl-3-methoxy - 1,2,3,5,6,6a,7,β,8 - octahydrocyclopenta - [f][1]-benzopyran as a colorless oil.

IR spectrum: band at 6.1μ.
UV spectrum: $\lambda_{max}$ 249 nm.; ε=12,000.
$[\alpha]_D^{20} = +5.4°$ (c.=1; benzene).

(d) 3.4 g. of 7α-tert.-butoxy-3,6aα-dimethyl-3-methoxy - 1,2,3,5,6,6a,7β,8 - octahydrocyclopenta - [f][1]-benzopyran is dissolved in 80 ml. of ethyl acetate and, after the addition of 300 mg. of palladium animal charcoal, hydrogenated at room temperature and under normal pressure. The hydrogen absorption (260 ml.) is terminated within 2 hours. The reaction product is filtered off from the catalyst, the solvent is removed under vacuum, and 3.3 g. of 7α-tert.-butoxy-3,6aα-dimethyl-3-methoxy - 1,2,3,5,6,6a,7β,8,9,9aβ - decahydrocyclopenta-[f][1]-benzopyran is obtained as a colorless oil.

$[\alpha]_D^{20} = +16.8°$
(c.=1; benzene).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A benzopyran of the formula

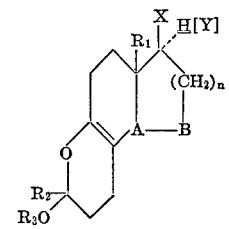

wherein $R_1$, $R_2$ and $R_3$ each are lower alkyl; $n$ is the integer 1 or 2; A—B is CH—CH$_2$ or C=CH; X is OH, alkoxy of 1–10 carbon atoms, alkanoyloxy of 1–10 carbon atoms or benzyloxy and Y is H.

2. A benzopyran according to Claim 1 wherein $n$ is 1.
3. A benzopyran according to Claim 1 wherein $R_1$, $R_2$ and $R_3$ are methyl or ethyl.
4. A benzopyran according to Claim 1 wherein A—B is C=CH.
5. A benzopyran according to Claim 1 wherein A—B is CH—CH$_2$.
6. A benzopyran according to Claim 1 wherein X is —OH.
7. A benzopyran according to Claim 1 wherein $n$ is 1, $R_1$, $R_2$ and $R_3$ are methyl or ethyl and X is —OH.
8. A benzopyran of Claim 1, rac.-3,6aα-dimethyl-3-methoxy - 2,3,5,6,6a,8 - hexahydrocyclopenta - [f][1]-benzopyran-7[1H]-one.
9. A benzopyran of Claim 1, (−) - 3,6aα - dimethyl-3 - methoxy - 2,3,5,6,6a,8 - hexahydrocyclopenta - [f]-[1]-benzopyran-7[1H]-one.
10. A benzopyran of Claim 1, rac. - 3,6aα - dimethyl-3 - ethoxy - 2,3,5,6,6a,8 - hexahydrocyclopenta - [f][1]-benzopyran-7[1H]-one.

11. A benzopyran of Claim 1, (—) - 3 - methyl - 6aα-ethyl - 3 - methoxy - 2,3,5,6,6a,8 - hexahydrocyclopenta-[f][1]-benzopyran-7[1H]-one.

12. A benzopyran of Claim 1, rac. - 3,6aα - dimethyl-3 - methoxy - 2,3,5,6,6a,8 - hexahydrocyclopenta - [f]-[1]-benzopyran-7[1H]α-ol.

13. A benzopyran of Claim 1, (—) - 3,6aα - dimethyl-3 - methoxy - 2,3,5,6,6a,8 - hexahydrocyclopenta - [f]-[1]-benzopyran-7[1H]α-ol.

14. A benzopyran of Claim 1, rac. - 3,6aα - dimethyl-3 - ethoxy - 2,3,5,6,6a,8 - hexahydrocyclopenta - [f]-[1]-benzopyran-7[1H]α-ol.

15. A benzopyran of Claim 1, (—) - 3 - methyl - 6aα-ethyl - 3 - methoxy - 2,3,5,6,6a,8 - hexahydrocyclopenta-[f][1]-benzopyran-7[1H]α-ol.

16. A benzopyran of Claim 1, rac. - 3,6aα - dimethyl-3 - methoxy - 2,3,5,6,6a,8,9,9aβ - octahydrocyclopenta-[f][1]-benzopyran-7[1H]α-ol.

17. A benzopyran of Claim 1, (—) - 3,6aα - dimethyl-3 - methoxy - 2,3,5,6,6a,8,9,9aβ - octahydrocyclopenta-[f][1]-benzopyran-7[1H]α-ol.

18. A benzopyran of Claim 1, rac. - 3,6aα - dimethyl-3 - ethoxy - 2,3,5,6,6a,8,9,9aβ - octahydrocyclopenta-[f][1]-benzopyran-7[1H]α-ol.

19. A benzopyran of Claim 1, (—) - 3 - methyl - 6aα-ethyl - 3 - methoxy - 2,3,5,6,6a,8,9,9aβ - octahydrocyclo-penta-[f][1]-benzopyran-7[1H]α-ol.

20. A benzopyran of Claim 1, 7α - benzoyloxy - 3,6aα-dimethyl - 3 - methoxy - 1,2,3,5,6,6a,7β,8 - octahydrocy-clopenta-[f][1]-benzopyran.

21. A benzopyran of Claim 1, 7α - benzoyloxy - 3,6aα-dimethyl - 3 - methoxy - 1,2,3,5,6,6a,7β,8,9,9aβ - deca-hydrocyclopenta-[f][1]-benzopyran.

22. A benzopyran of Claim 1, 7α - tert. - butyloxy-3,6aα- - dimethyl - 3 - methoxy - 1,2,3,5,6,6a,7β,8 - octa-hydrocyclopenta-[f][1]-benzopyran.

23. A benzopyran of Claim 1, 7α - tert. - butyloxy-3,6aα - dimethyl - 3 - methoxy - 1,2,3,5,6a,7β,8,9,9aβ-decahydrocyclopenta-[f][1]-benzopyran.

24. A process for the production of a benzopyran of the formula

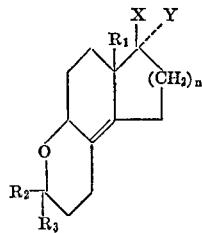

wherein $R_1$, $R_2$ and $R_3$ each are lower alkyl; $n$ is the integer 1 or 2; X is hydroxy, acyloxy wherein acyl is the acyl radical of a hydrocarbon carboxylic acid of 1–10 carbon atoms optionally substituted by phenyl, or alkoxy of 1–10 carbon atoms optionally substituted by phenyl and Y is H; or X and Y collectively are =O, which comprises catalytically cyclizing, in the presence of a catalytic amount of a mineral acid, a sulfonic acid, a Lewis acid, a carboxylic acid or a phenol, a compound of the formula

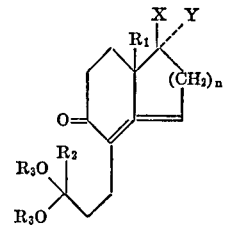

wherein $R_1$, $R_2$, $R_3$, X, Y and $n$ have the values given above, to form said benzopyran.

25. A process according to Claim 24 wherein $n$ is 1.

26. A process according to Claim 24 wherein $R_1$, $R_2$ and $R_3$ are methyl or ethyl.

27. A process according to Claim 24 wherein X is an esterified hydroxy group.

28. A process according to Claim 24 wherein X and Y collectively are =O.

29. A process according to Claim 24 wherein the acidic catalyst is a mineral acid.

30. A process according to Claim 29 wherein 0.001 mol to 0.1 mol of the catalyst is employed per mol of starting compound.

31. A process according to Claim 24 wherein the cyclization is conducted in an aprotic solvent.

References Cited
UNITED STATES PATENTS

| | | | |
|---|---|---|---|
| 3,576,006 | 4/1971 | Saucy | 260—345.2 X |
| 3,716,561 | 2/1973 | Andrews et al. | 260—345.2 X |

JOHN M. FORD, Primary Examiner

U.S. Cl. X.R.

260—999, 468 R, 478, 469, 586 H

UNITED STATES PATENT OFFICE
CERTIFICATE OF CORRECTION

Patent No. 3,849,447    Dated November 19, 1974

Inventor(s) ULRICH EDER ET AL

It is certified that error appears in the above-identified patent and that said Letters Patent are hereby corrected as shown below:

The Assignee of record, namely, Schering Aktiengesellschaft, Berlin, Germany, should be of Berlin and Bergkamen, Germany.

Claim 1, line 2: the formula should be:

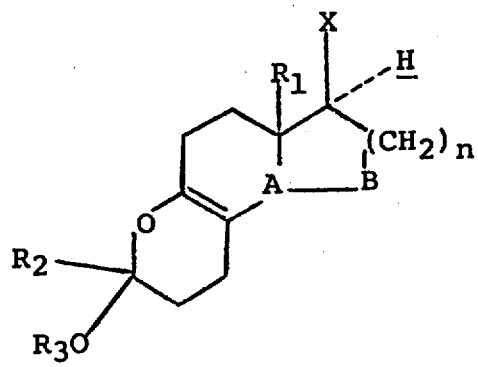

Claim 24, line 3: the first formula should be:

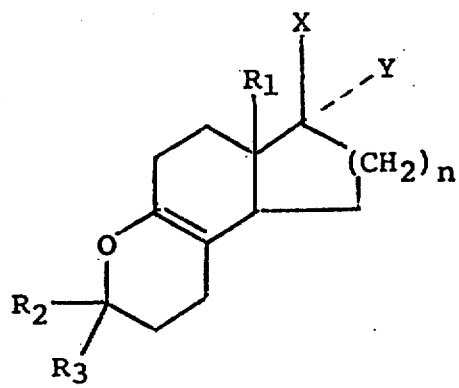

UNITED STATES PATENT OFFICE
CERTIFICATE OF CORRECTION

Patent No. 3,849,447    Dated November 19, 1974

Inventor(s)  ULRICH EDER ET AL

It is certified that error appears in the above-identified patent and that said Letters Patent are hereby corrected as shown below:

Claim 24: the second formula should be:

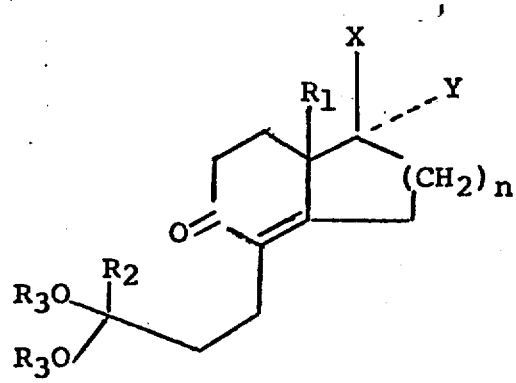

Signed and sealed this 8th day of April 1975.

(SEAL)
Attest:

RUTH C. MASON
Attesting Officer

C. MARSHALL DANN
Commissioner of Patents
and Trademarks